Jan. 13, 1953     M. L. HARRISON ET AL     2,625,209
INFLATABLE RUBBER ARTICLE
Filed July 28, 1948
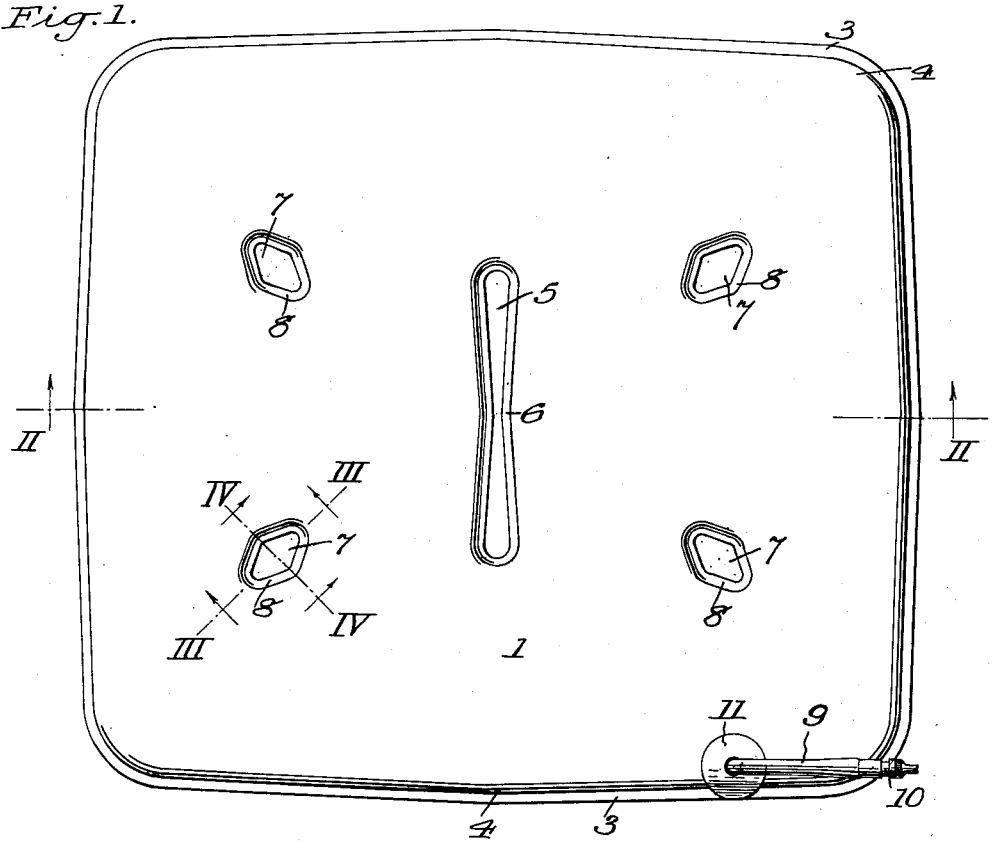
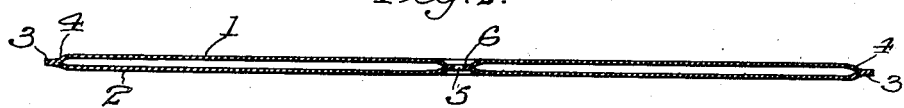
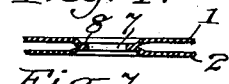
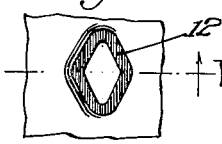
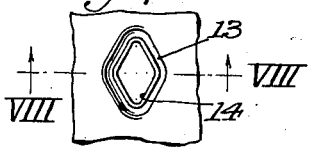
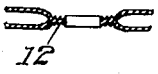
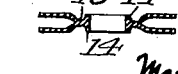
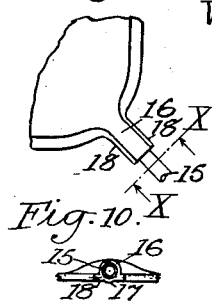
INVENTORS
Marshall L. Harrison
William D. Stearns
by Brown + Seward
ATTORNEYS Patented Jan. 13, 1953

2,625,209

UNITED STATES PATENT OFFICE 2,625,209

INFLATABLE RUBBER ARTICLE

Marshall L. Harrison, Roslyn Estates, and William D. Stearns, Freeport, N. Y., assignors to Parker, Stearns and Company, New York, N. Y., a corporation of New York Application July 28, 1948, Serial No. 41,033

3 Claims. (Cl. 155—179)

This invention relates to an inflatable rubber article, and an object of the invention is to provide such an article, in the nature of a cushion or the like, which is formed by two matching sheets of rubber simultaneously cut to the desired shape and joined by a weld adjacent their cut edges by a die cutting and coreless molding process, whereby said edges are not only permanently secured together but also constitute a reinforcement aiding in determining the inflated shape of the article. The expressions "weld" or "welding" as used herein refer to the joining of the sheets by fusion under heat and pressure, and the word "rubber," while referring primarily to a compound approximating "inner tube stock," is not intended to exclude equivalent synthetic materials which can be welded by heat and pressure to form inflatable articles of the character described and claimed.

Another object is to provide openings or vents extending through the article, serving by their presence as ventilating means, and by their shape and arrangement as means to control the inflated shape of the article; the margins of these openings being formed in the same manner as the peripheral margins of the article.

A further object is to provide certain improvements in the form and arrangement of the several elements whereby the above named and other objects may effectively be attained.

A practical embodiment of the invention is shown in the accompanying drawing in which:

Fig. 1 represents a top plan view of an inflatable cushion;

Fig. 2 represents a transverse vertical section taken on the line II—II of Fig. 1;

Fig. 3 represents a detail vertical section taken on the line III—III of Fig. 1;

Fig. 4 represents a detail vertical section taken on the line IV—IV of Fig. 1;

Fig. 5 represents a detail top plan view of a modified form of opening;

Fig. 6 represents a vertical section taken on the line VI—VI of Fig. 5;

Fig. 7 represents a detail top plan view of another modified form of opening;

Fig. 8 represents a vertical section taken on the line VIII—VIII of Fig. 7;

Fig. 9 represents a detail top plan view of a modified form of filling tube; and Fig. 10 represents a vertical section taken on the line X—X of Fig. 9.

Referring to the drawings, the inflatable rubber article is shown as a seat cushion, the upper wall 1 and lower wall 2 being sheets of suitably compounded natural and/or synthetic vulcanized rubber. The peripheral edges of the sheets 1 and 2 are welded together flatwise, preferably by a process in which the unvulcanized sheets are simultaneously die cut and molded by heat and pressure, to constitute a reinforcing bead 3 having a flat thickness preferably somewhat less than the total thickness of the sheets 1 and 2. Adjacent the inner line of junction of the sheets, however, the displacement of rubber from the flat bead portion, during the welding operation, causes a slight increase in the total thickness (at 4, for instance) with a resulting increase in strength along this line.

The cushion is preferably provided with ventilating and shaping openings, one desirable arrangement of such openings being as shown in Fig. 1. An elongated opening 5 is formed near the middle of the cushion, this opening being bounded by a bead 6 of the same character as the bead 3. The opening 5 has rounded ends and a generally hour-glass shape, being narrowest in the middle and widening toward the ends. Additional openings 7, 7, of diamond shape with rounded corners are disposed at suitable points between the middle opening 5 and the periphery of the cushion, each opening 7 being bounded by a bead 8 of the same character as the beads 3 and 6, and having its major axis lying approximately radially with respect to the center of the cushion.

A filling tube 9 having a valve 10 is shown as being applied by means of a patch 11 to the sheet 1 near one of the corners of the cushion so that the latter may be inflated.

Figs. 5 and 6 show a modified bead 12 (corresponding to beads 8) in which the upper and lower surfaces thereof are ridged or corrugated by corrugations extending parallel to the major axis of the diamond-shaped openings.

Figs. 7 and 8 show a modified bead 13 (corresponding to beads 8 or 12) in which the inner edge thereof is thickened to form a flange or flanges 14.

Figs. 9 and 10 show a modified form of filling tube in which a rubber tube 15 (corresponding to the tube 9, in Fig. 1) is welded to outwardly extending tabs 16, 17 of the sheets 1, 2, the side edges of these tabs being welded together to form narrow beads 18 which are continuations of the bead 3 around the periphery of the cushion. The tube 15 is normally provided with a valve (not shown) as in the case of tube 9.

When the cushion is inflated (through the tube 9) the upper and lower walls naturally separate except where they are joined around the periphery of the cushion and around each opening 5, 7, and the disposition of these openings is such as to control the expansion of the cushion and give it the desired inflated shape. The sides of the opening 5 become substantially straight and parallel while the openings 7 tend to become more rounded, since they yield more readily to a pull in the direction of their minor axes than to pulls in other directions. Inflation also tends to straighten the outwardly bowed sides of the cushion, with the total result that the inflated cushion is generally rectangular and gives properly balanced resilient support throughout all of its area except where the ventilating and shaping openings are formed. By increasing or decreasing the number of openings 7, or by changing their positions either with respect to their major and minor axes or with respect to the cushion as a whole, special modifications of the surface contour and distribution of supporting areas can be obtained. In larger or different shaped cushions or other inflatable articles, the use of more than one elongated opening, alone or combined with diamond shaped openings in suitable number and arrangement, may be desirable.

The modified form of bead shown at 12 (Figs. 5 and 6) has the effect of permitting greater expansion of the opening in the direction of its minor axis; while the bead 13 (Figs. 7 and 8) with its flange or flanges 14 restricts somewhat the expansion of the opening in any direction, these results being desirable under certain circumstances.

A suitable method and apparatus for forming articles of the character described and claimed herein are shown and claimed in our copending applications Ser. No. 41,034, filed July 28, 1948, and division thereof Ser. No. 125,402, filed November 4, 1949.

It will be understood that various changes may be resorted to in the construction, form and arrangement of the several parts without departing from the spirit and scope of our invention, and hence we do not intend to be limited to the particular embodiment herein shown and described, but what we claim is:

1. An inflatable article of the character described comprising generally rectangular upper and lower walls of elastic rubber-like sheet material free of fabric reinforcement, the peripheral edges of which are welded together flatwise to form a reinforcing bead lying substantially in the median horizontal plane of the article when inflated and at least two opposite sides being bowed slightly outward when the article is deflated, there being formed through said walls at least one elongated opening, narrower in the middle than at the ends when the article is deflated, and a plurality of diamond-shaped openings, the edges of said walls around said elongated and diamond-shaped openings being welded together flatwise to form beads.

2. An inflatable article of the character described comprising upper and lower walls of elastic rubber-like material free of fabric reinforcement, the peripheral edges of which are welded together flatwise to form a reinforcing bead lying substantially in the median horizontal plane of the article when inflated, there being formed through said walls at least one elongated opening, narrower in the middle than at the ends when the article is deflated, the edges of said walls around said opening being welded together flatwise to form a bead, at least part of each aforesaid bead having a thickness less than the total thickness of the upper and lower walls, and the part of each said bead adjacent the line of junction of said walls having a thickness greater than said total.

3. An inflatable article according to claim 2 in which there are a plurality of openings, at least one opening being elongated and narrower in the middle than at the ends and at least one other opening being approximately diamond-shaped.

MARSHALL L. HARRISON.
WILLIAM D. STEARNS.

REFERENCES CITED

The following references are of record in the file of this patent:

UNITED STATES PATENTS

| Number | Name | Date |
|---|---|---|
| 1,595,006 | Kelly | Aug. 3, 1926 |
| 1,726,939 | Anderson | Sept. 3, 1929 |
| 2,269,342 | Johnson | Jan. 6, 1942 |
| 2,297,127 | Beal | Sept. 29, 1942 |
| 2,343,996 | Perry | Mar. 14, 1944 |

FOREIGN PATENTS

| Number | Country | Date |
|---|---|---|
| 219,171 | Great Britain | July 24, 1924 |
| 427,176 | Germany | Mar. 30, 1926 |